United States Patent
Ysebaert et al.

(10) Patent No.: US 10,405,482 B2
(45) Date of Patent: Sep. 10, 2019

(54) FOLDABLE HEADER

(71) Applicant: CNH Industrial America LLC, New Holland, PA (US)

(72) Inventors: Maarten Ysebaert, Tielt (BE); Pieter Van Overschelde, Sint-Andries (BE); Sandor van Vooren, Sijsele-Damme (BE)

(73) Assignee: CNH Industrial America LLC, New Holland, PA (US)

( * ) Notice: Subject to any disclaimer, the term of this patent is extended or adjusted under 35 U.S.C. 154(b) by 14 days.

(21) Appl. No.: 15/789,445

(22) Filed: Oct. 20, 2017

(65) Prior Publication Data

US 2018/0110176 A1    Apr. 26, 2018

(30) Foreign Application Priority Data

Oct. 21, 2016 (BE) .................................. 2016/5796

(51) Int. Cl.
*A01B 73/04* (2006.01)
*A01D 41/14* (2006.01)
*A01D 45/02* (2006.01)

(52) U.S. Cl.
CPC .......... *A01B 73/044* (2013.01); *A01B 73/046* (2013.01); *A01D 41/144* (2013.01); *A01D 45/021* (2013.01)

(58) Field of Classification Search
CPC ..... A01B 73/044; A01B 73/046; A01B 63/22; A01B 63/32; A01B 73/02; A01B 73/042; A01D 41/144; A01D 45/021
See application file for complete search history.

(56) References Cited

U.S. PATENT DOCUMENTS

| | | | |
|---|---|---|---|
| 4,409,780 A | 10/1983 | Beougher et al. | |
| 4,867,245 A * | 9/1989 | Stevens | A01B 73/046 172/311 |
| 5,146,733 A * | 9/1992 | Klaeger | A01D 75/30 56/10.4 |
| 5,178,328 A * | 1/1993 | Broyhill | A01M 7/0075 172/311 |

(Continued)

FOREIGN PATENT DOCUMENTS

| | | |
|---|---|---|
| DE | 10157289 A1 | 6/2003 |
| DE | 102014013141 A1 | 3/2016 |

(Continued)

*Primary Examiner* — Arpad Fabian-Kovacs

(74) *Attorney, Agent, or Firm* — Peter K. Zacharias; Patrick M. Sheldrake

(57) ABSTRACT

A header comprising multiple row elements along a width of the header. The multiple row elements are connected to a frame which is segmented into two peripheral segments and two central segments. Each peripheral segment is connected to an adjacent one of the central segments via a respective distal pivot, and the central segments are interconnected via a central pivot. The distal pivots are arranged to allow a rotation of the peripheral segments with respect to the central segments. The central pivot are arranged to allow a central rotation of the central segments with respect to each other, such that the segments are movable with respect to each other between a folded state and an operating state.

13 Claims, 4 Drawing Sheets

(56) References Cited

U.S. PATENT DOCUMENTS

| | | | | |
|---|---|---|---|---|
| 5,577,563 A * | 11/1996 | Holen | A01B 73/044 | 111/57 |
| 5,845,472 A * | 12/1998 | Arnold | A01D 41/144 | 56/94 |
| 6,220,366 B1 * | 4/2001 | Noonan | A01B 73/046 | 172/311 |
| 6,367,562 B1 * | 4/2002 | Mosdal | A01B 73/046 | 172/311 |
| 6,684,962 B1 * | 2/2004 | Lewallen | A01B 63/22 | 111/57 |
| 7,043,889 B2 * | 5/2006 | Rauch | A01B 73/046 | |
| 9,173,345 B2 * | 11/2015 | Cressoni | A01D 45/021 | |
| 9,795,083 B2 * | 10/2017 | Van Vooren | A01D 41/144 | |
| 9,918,430 B2 * | 3/2018 | Roberge et al. | A01D 41/144 | |
| 2003/0041579 A1 * | 3/2003 | Wuebbels | A01D 41/144 | 56/15.2 |
| 2004/0182060 A1 | 9/2004 | Rauch | | |
| 2005/0028509 A1 * | 2/2005 | Viaud | A01D 41/148 | 56/341 |
| 2006/0254240 A1 * | 11/2006 | Krone | A01D 41/144 | 56/16.6 |
| 2014/0047810 A1 | 2/2014 | Peters et al. | | |
| 2014/0060035 A1 * | 3/2014 | Barfels | F15B 1/024 | 60/484 |
| 2014/0060860 A1 * | 3/2014 | Maro | A01B 73/046 | 172/1 |
| 2014/0060861 A1 * | 3/2014 | Blunier | A01B 73/046 | 172/1 |
| 2014/0060865 A1 * | 3/2014 | Maro | A01B 73/046 | 172/311 |
| 2014/0060868 A1 * | 3/2014 | Blunier | A01B 73/044 | 172/311 |
| 2015/0068779 A1 * | 3/2015 | Naylor | A01B 73/046 | 172/1 |
| 2015/0129252 A1 * | 5/2015 | Sudbrink | A01B 73/046 | 172/1 |
| 2016/0044863 A1 * | 2/2016 | Williams | A01B 73/044 | 111/120 |
| 2016/0066508 A1 | 3/2016 | Van Vooren | | |
| 2016/0212929 A1 * | 7/2016 | Wileniec | A01B 63/22 | |
| 2016/0255762 A1 * | 9/2016 | Billard | A01B 73/042 | |
| 2017/0079197 A1 * | 3/2017 | Steinlage | A01B 19/02 | |
| 2017/0332543 A1 * | 11/2017 | Magarity | A01B 73/046 | |
| 2018/0070526 A1 * | 3/2018 | Henry | A01B 73/046 | |
| 2018/0184573 A1 * | 7/2018 | Hadley | A01B 73/046 | |
| 2018/0184592 A1 * | 7/2018 | Lehman | A01D 45/021 | |

FOREIGN PATENT DOCUMENTS

| | | |
|---|---|---|
| EP | 1008286 A1 | 6/2000 |
| EP | 1695603 A1 | 8/2006 |

\* cited by examiner

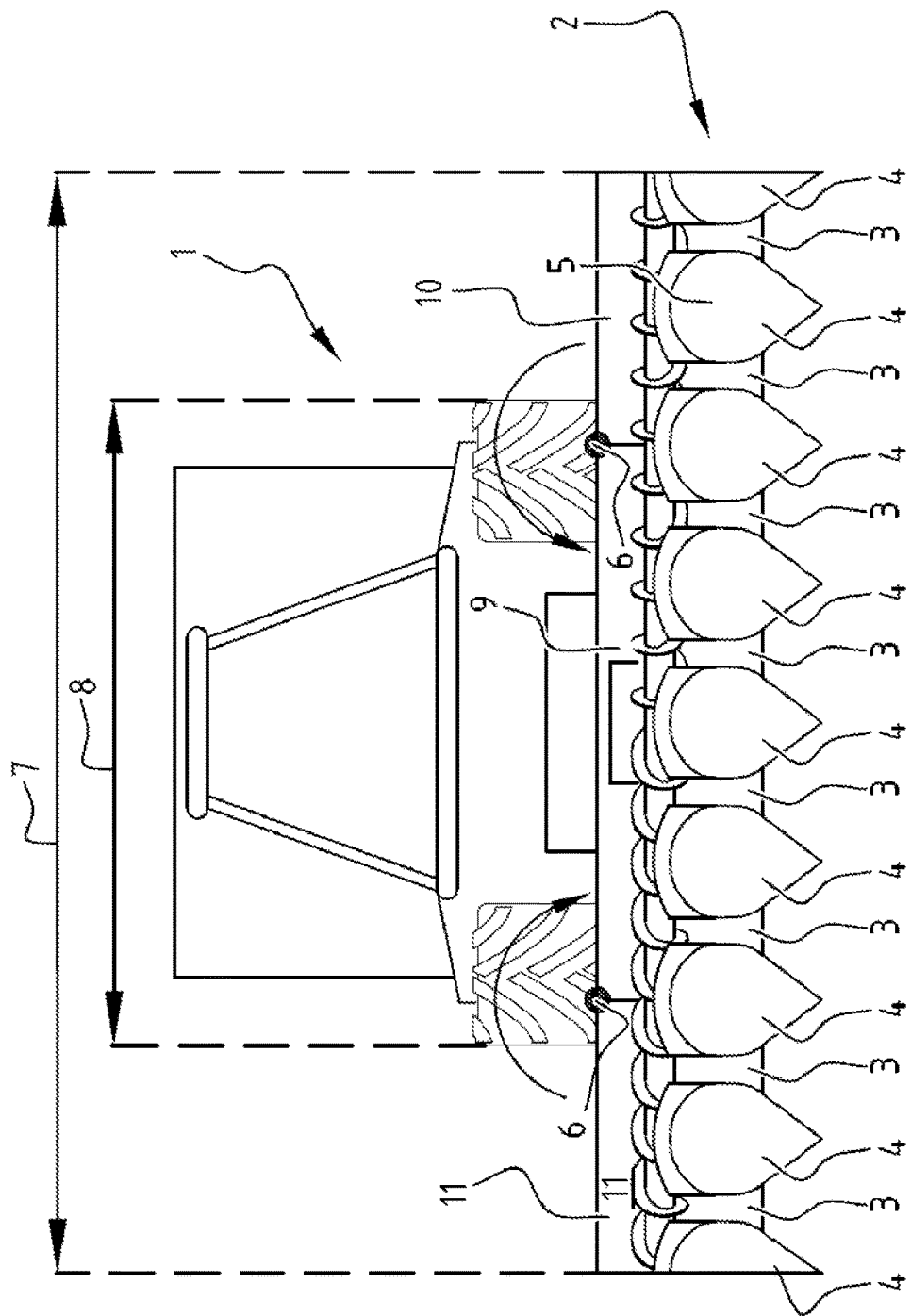

FOLDABLE HEADER

FIELD OF THE INVENTION

The present invention relates to a header with multiple row elements along the width of the header. Particularly, the invention relates to a foldable header.

BACKGROUND OF THE INVENTION

Headers with multiple row elements along the width of the header are typically used for harvesting corn or sunflowers. Therefore such headers are also known as corn headers or sunflower headers. The majority of these corn or sunflower headers are row sensitive, and therefore these headers are provided with multiple row elements along the width of the header. Each of the row elements is adapted to process a corresponding row on the field. By making these headers foldable, they can stay attached to the agricultural combine while driving on the road. This makes transport between fields more convenient, and makes it possible to legally drive from farm to field via public roads. The majority of the drive lines, hydraulics and electric connections do not need to be disconnected. To be allowable on the road, a folded header should fall within a predetermined width, the latter being defined set by homologation limits in most countries. In some important European countries, this homologation limit requires the width of the vehicle to fall within about 3.5 m.

In the past, most foldable headers comprised six or eight row elements along the width of the header. Simple folding mechanisms were provided to fold the last row or last pairs of rows inward so that the header falls within the 3.5 m. Combine capacities have grown over the past years. Therefore, the market requests bigger corn headers that also comply with the homologation rules.

US2016/0066508 describes a folding concept for a header with multiple row elements along the width. However, using this folding concept, it is not possible to fold a header to fall within the 3.5 m boundaries.

It is an object of the invention to provide a foldable header that allows to fold a large header in a compact and convenient manner.

SUMMARY OF THE INVENTION

To this end, the header comprises multiple row elements along the width of the header, the multiple row elements being connected to a frame which is segmented into two peripheral segments and two central segments, each peripheral segment being connected to an adjacent one of the central segments via a respective distal pivot and the central segments being interconnected via a central pivot, wherein the distal pivots are arranged to allow a distal rotation of the peripheral segments with respect to the central segments, and the central pivot being arranged to allow a central rotation of the central segments with respect to each other, such that the segments are movable with respect to each other between a folded state and an operating state.

The header of the invention comprises four segments and three pivots, thereby one pivot is central and two pivots are distal. The distal pivots are arranged to allow a first rotation while the central pivot is arranged to allow a second rotation. A header with four segments, interconnected with a central and two distal pivots that allow different rotations, is foldable in a much more compact manner than the prior art headers with only three or less segments. Tests and simulations show that the folding concept of the invention, with the four segments and with the central pivot and two distal pivots, allows forming a header with up to 12 or more row elements, which is foldable so that in the folded state, the width of the header is smaller than 3.5 m. As a result thereof, homologation requirements are met in some important European countries. This shows that a foldable header according to the invention allows to be folded in a compact and convenient manner.

Preferably, the distal pivots are arranged to allow a rotation of the peripheral segments with respect to the central segments of at least 150°, preferably at least 165°, most preferably about 180° and wherein the distal pivots are oriented to allow such rotation along an axis which is substantially parallel to a forward driving direction of an agricultural vehicle operating the header. Further preferably, the central pivot is provided to allow a rotation of the central segments with respect to each other of at least 150°, preferably at least 165°, most preferably about 180° and wherein the central pivot is oriented to allow such rotation along an axis which is substantially parallel to a forward driving direction of an agricultural vehicle operating the header. In this context, substantially parallel to a forward driving direction is meant to include a slightly inclined position with respect to the forward driving direction. Current folding headers have this axis at 16° with respect to the forward driving direction, which is therefore in this context considered substantially parallel to a forward driving direction.

Particularly, when the direction of the distal rotation is opposite to the direction of the central rotation, a simple and effective folding mechanism is provided. This folding mechanism not only allows the header to be folded into a compact state, but has further substantial advantages and effects, which is surprising.

A first effect relates to the simplicity of the movement of the segments with respect to each other. Between adjacent sections, only a single degree of freedom is provided, such that a simple and reliable rotatable connection such as a hinge can be provided between the segments. This significantly simplifies and reduces the costs for interconnecting the segments while increasing the reliability of the folding mechanism. No complex movements and/or constructions are required to allow a rotation with a single degree of freedom.

A second surprising effect relates to the location of the center of gravity of the header. When the segments rotate around axes that are substantially parallel to the forward driving direction of the agricultural vehicle operating the header, the center of gravity remains substantially the same. This is in contrast with systems where segments are rotated along, for example, upright axes or where segments perform a translating movement, resulting in a displacement of the center of gravity. Particularly, a forward displacement would create problems since it would increase the loads and/or forces on the agricultural vehicle required to carry the header. This would also increase loads transferred by the wheels to the road surface, which is also limited by national homologation limits.

A third surprising effect relates to the height of the folded header. A folded header that is too high would block the free sight from the agricultural vehicle that is required to drive the agricultural vehicle over the field or on the road. The folding mechanism of the invention allows to fold the header not only with a limited width, but also with a limited height so that a predetermined area of sight from the agricultural vehicle remains free.

Preferably, the distal rotation is an upward rotation and the central rotation is a downward rotation, and wherein the header further comprises a connector for connecting the header to an agricultural vehicle, and wherein the header frame is connected to the connector via a lifting mechanism adapted to lift the header frame, when the header is in the folded state, from an operating position to a lifted position above the operating position. In this preferred embodiment, the peripheral segments are adapted to rotate upward with respect to the central segments, and the central segments are adapted to rotate downward with respect to each other. The downward rotation of the central segments around the central pivot moves the central segments and the peripheral segments to a lower position. To prevent collision with the ground surface, a lifting mechanism is provided between the connector connecting the header to the agricultural vehicle, and the frame of the header, so that the downward movement can be at least partially compensated by lifting the header in the folded state. The lifting mechanism thereby allows to position the header with respect to the connector in an operating position, and to lift the frame of the header, when folding the header, from the operating position to a lifted position which is above the operating position.

Preferably, the distal pivots are located, in the operating state of the segments, at an upper end of the respective segments and at a side edge of each segment facing the other of the respective segments in the operating state. This location of the distal pivots allows the peripheral segments to rotate upward over about 180° so that the peripheral segments can be laid on top of the corresponding central segments.

Preferably, the central pivot is connected in the operating state of the segments, at a lower end of the central segments and at a side edge of each central segment facing the other central segment in the operating state. This location of the central pivot allows the central segments to rotate downward towards each other over about 180° so that the bottom parts of the central segments can be laid against each other.

Preferably, the operating state of the segments corresponds to a state where the two peripheral segments and two central segments extend parallel and face each other with their respective head sides, while the folded state of the segments corresponds to a state wherein the two peripheral segments and two central segments extend parallel and face each other with their respective longitudinal sides. Thereby, the width of the header is maximized in the operational state, while the compactness of the header is optimized in the folded state.

Preferably, the frame segments comprise respective rigid structures, which rigid structures carry the multiple row elements and which rigid structures are interconnected via the distal pivots and the central pivot. Further, preferably, at each of the distal pivots and central pivot, an actuator is provided to actuate the rotation. By providing the actuator to actuate the rotation, the folding and unfolding of the header can be fully automatic. This relieves the operator of the agricultural vehicle from manual tasks when folding and unfolding the header. It further optimizes the reliability of the header.

Preferably, the multiple row elements are driven via at least one driving shaft extending along the width of the header in the operating state, and wherein the driving shaft is provided with detachable couplings between the segments. The detachable couplings allow the driving shaft in one segment to be detached from the driving shaft in another segment when folding the header. Furthermore, when unfolding the header in the operational state, the detachable couplings interconnect, preferably automatically, so that power can be transmitted from one segment to another segment via the detachable coupling of the driving shaft.

The above mentioned structure and mechanism allows the header to be formed with at least ten row elements, three of the ten row elements provided at each central segment and two of the ten row elements provided at each peripheral segment. These mechanisms also allow a header to be formed with twelve row elements, three of the twelve row elements provided at each central segment and three of the twelve row elements provided at each peripheral segment. A skilled person will understand that header with deviating numbers of row elements can also be formed according to the invention. Should the distance between adjacent rows decrease, higher numbers of row elements can be manufactured using the principles of the present invention.

BRIEF DESCRIPTION OF THE DRAWINGS

Some embodiments of apparatus and/or methods in accordance with embodiments of the present invention are now described, by way of example only, and with reference to the accompanying drawings, in which:

FIGS. 1A and 1B show a front view of an agricultural vehicle with a prior art header;

DETAILED DESCRIPTION OF THE DRAWINGS

Figure 1B:
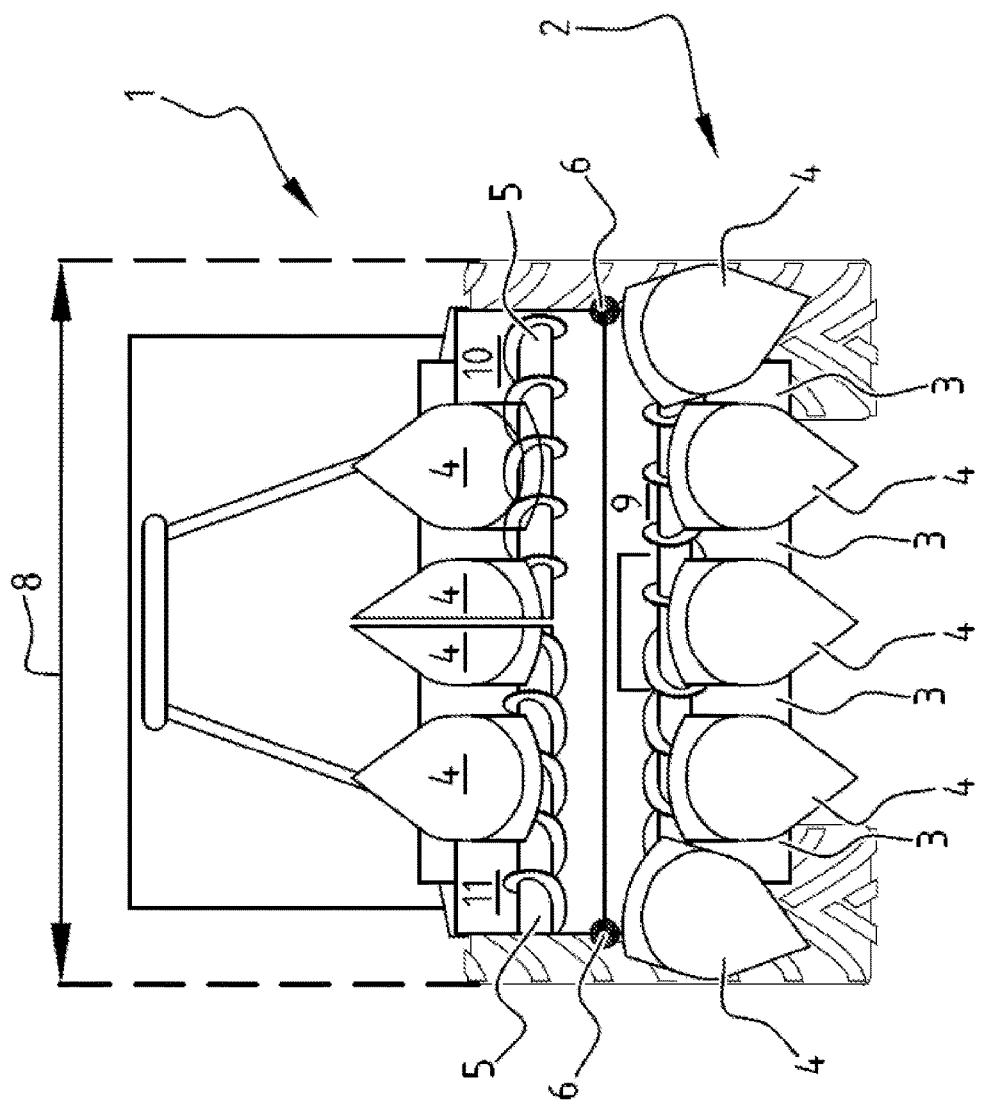

FIGS. 1A and 1B show an agricultural combine 1 carrying a prior art header 2. The agricultural combine 1 is shown in a front view. In FIG. 1A the prior art header 2 is shown in an operating state, while in FIG. 1B the prior art header 2 is shown in a folded state.

The agricultural combine 1, considered without the header 2, has a width 8. The width 8 of the agricultural combine 1 is smaller than a predetermined width such that the agricultural combine 1 may drive on public roads. As described above, legislation defines such maximum predetermined width. In some important European countries this predetermined width is about 3.5 m. The prior art header 2 is designed to have a folded state, as is shown in FIG. 1B, such that the width of the prior art header 2 in the folded state is smaller than the predetermined width.

The present invention particularly relates to headers of the type having multiple row elements along the width of the header. Such headers are known for example as corn header or sunflower headers. Each row element is adapted to process a corresponding row of crop elements on the field. The distance between adjacent row elements and adjacent rows on the field is preferably substantially identical and is preferably substantially constant. Each of the row elements of the header is adapted to harvest and at least partially process a corresponding row on the field.

In FIGS. 1A and 1B row elements are indicated with reference number 3. In the prior art header 2 as shown in FIGS. 1A and 1B, 8 row elements are equally divided along the width of the prior art header 2. From the description below, it will be evident that, to be able to fold the header within the predetermined width using the prior art folding concept of FIGS. 1A and 1B, 8 row elements is a maximum number of row elements. When more row elements are added, it is not possible anymore, using the prior art folding concept of FIGS. 1A and 1B, to fold a header 2 within the predetermined width.

The prior art header 2 comprises hoods 4 between adjacent row elements 3. The hoods guide the crop material on the field towards the front end of the row elements 3. The row elements at least partially process the crop elements, for example by pulling the corn cobs from the stems. The crop is then transported by augers 5 to a central part of the header 2, where they enter the feeder of the agricultural vehicle 1 for further processing inside the body of the agricultural vehicle 1. These mechanisms for harvesting and processing the crop, including the row elements 3, hoods 4 and auger 5, are known and used for years already. Since the invention particularly relates to the folding concept, the crop harvesting and processing elements are not described in more detail.

The prior art header 2 has two pivots 6 at an upper left and right side of a central part 9 of the prior art header 2. The central part 9 of the prior art header 2 comprises 4 row elements. The prior art header 2 further comprises a first distal prior art segment 10 having two row elements 3, and a second distal prior art segment 11 also having two row elements 3. Via the pivots 6, the first and second distal prior art segments 10, 11 can be rotated upward over about 180° such that their upper sides lay substantially on top of the upper side of the central prior art segment 9. This is illustrated in FIG. 1B. The hoods 4 that extend over the pivot points are adapted to be at least partially rotated along with the distal segments 10, 11.

Drive elements (not shown) extending along the width of the header 2 are connected to each of the row elements 3 to drive the row elements. Since these drive elements extend along the width of the header, over multiple segments, these drive elements are also segmented, preferably comprising coupling means between adjacent segments. Thereby, it is clear that the drive elements are segmented at the location of the pivots 6. The coupling means are preferably adapted to automatically detach when the distal segments are rotated via the pivot 6 out of the operational state. The coupling means are further preferably adapted to automatically engage when the distal segments 10, 11 are rotated into the operational stage. Also for the transmission of the rotation of the auger 5 from one segment to another, such coupling means can be used. Coupling means showing this functionality are known and are therefore not described in more detail.

Figure 2A:
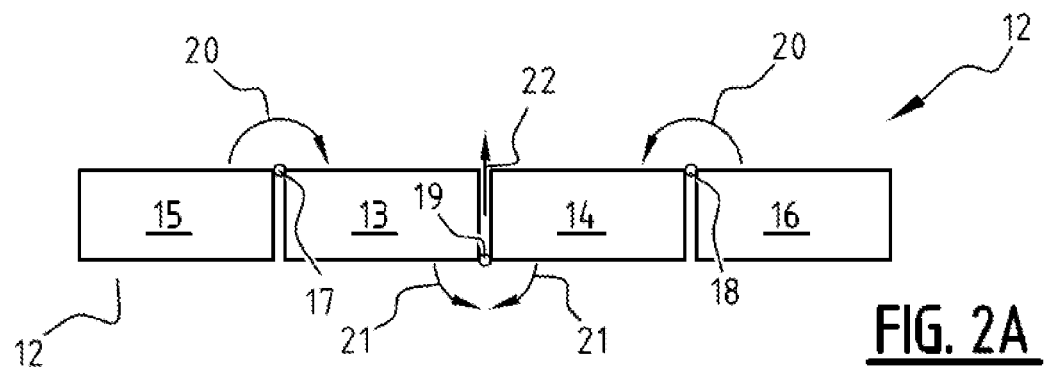
FIGS. 2A and 2B show a front view of a header according to an embodiment of the invention.
Figure 2B:
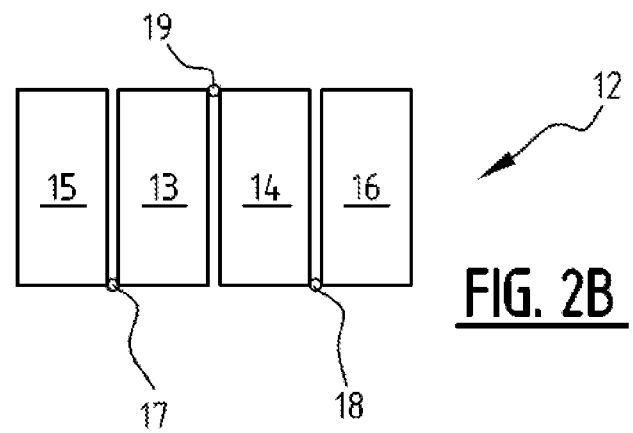

FIGS. 2A and 2B illustrate the folding concept according to a first embodiment of the invention. Thereby, FIG. 2A illustrates a header 12 in the operational state. FIG. 2B illustrates the same header 12 in the folded state. The header 12 according to this embodiment comprises a first central segment 13 and a second central segment 14 interconnected via a central pivot 19. The central pivot 19 is configured for allowing a second rotation 21, in the claims also referred to as central rotation, from the first and second central segments 13 and 14 with respect to each other. In the embodiment of FIG. 2A, the second rotation 21 is a downward rotation. For clarity and consistency reasons, a rotation direction is in this description always described as rotation out of the operational state of the header. It will be clear that the same pivot will allow a rotation in the opposite direction when the elements move into the operational state.

The header 12 further comprises a first distal segment 15 and a second distal segment 16 positioned adjacent to the first central segment 13 and the second central segment 14, respectively. Thereby, the first distal segment 15 is connected to the first central segment 13 via a first distal pivot 17, and the second distal segment 16 is connected to the second central segment 14 via a second distal pivot 18. The distal pivots 17 and 18 are configured to allow a first rotation 20, in the claims also referred to as distal rotation, of the distal segments 15, 16 with respect to the central segments 13, 14, respectively. The first rotation 20 is an upward rotation of the distal segments 15, 16 with respect to the central segments 13, 14, as illustrated with arrow 20. The central pivot 19 and the distal pivots 17 and 18 interconnect the segments 13, 14, 15, 16 at adjacent corners of the segments so that a rotation of about 180° is possible between each of the adjacent segments. From FIGS. 2A and 2B, it will be clear that adjacent segments rotate about 180° with respect to each other. This allows the segments 13, 14, 15, 16 to lay against each other with their head sides in the operational state, shown in FIG. 2A, and to lay against each other with their longitudinal sides in the folded state, as illustrated in FIG. 2B. In the operational state, the segments 13, 14, 15, 16 are horizontally oriented and in line with one another such that they reside in the same horizontal plane in order to pick up crop material. In the folded state, the segments 13, 14, 15, 16 are vertically oriented such that they are stacked adjacent to one another. Each of the segments 13, 14, 15, 16 may comprise up to three or more row elements so that the header of FIGS. 2A and 2B carries a total of twelve row elements. Tests and simulations have shown that the folding concept of FIGS. 2A and 2B allows the header 12 with up to twelve or more row elements to have a width less than the predetermined width in the folded state.

It is to be noted that the terms first rotation 20 and second rotation 21 are only used to differentiate between the rotation around the distal pivots 17, 18 and the central pivot 19. In practice, the second rotation 21 can occur before, during or after the first rotation 20 and the two distal (=first) rotations are not necessarily performed simultaneously. Also partial overlap of the different rotations in time is possible as is intermittently switching between partial rotation over one pivot and another.

Figure 4A:
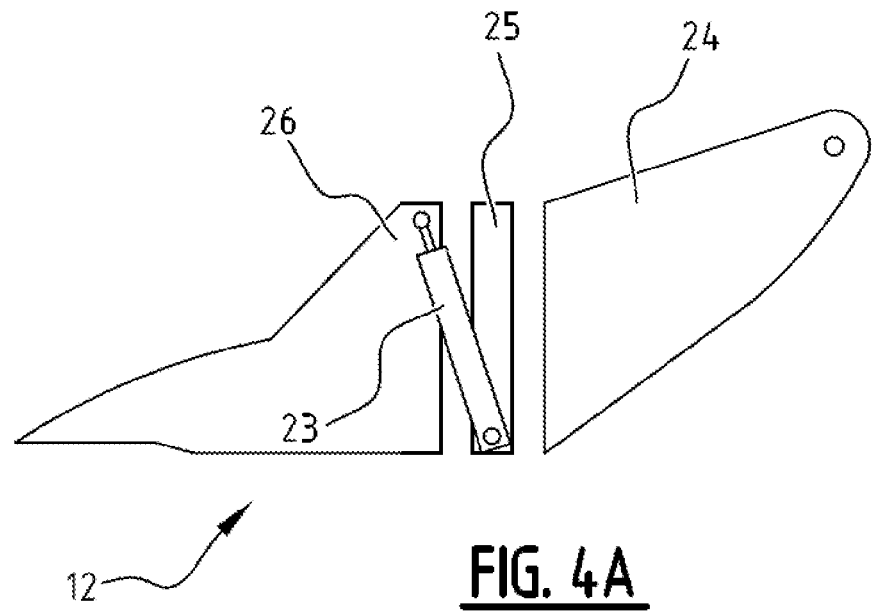
FIGS. 4A and 4B show a side view of a header according to an embodiment of the invention.
Figure 4B:
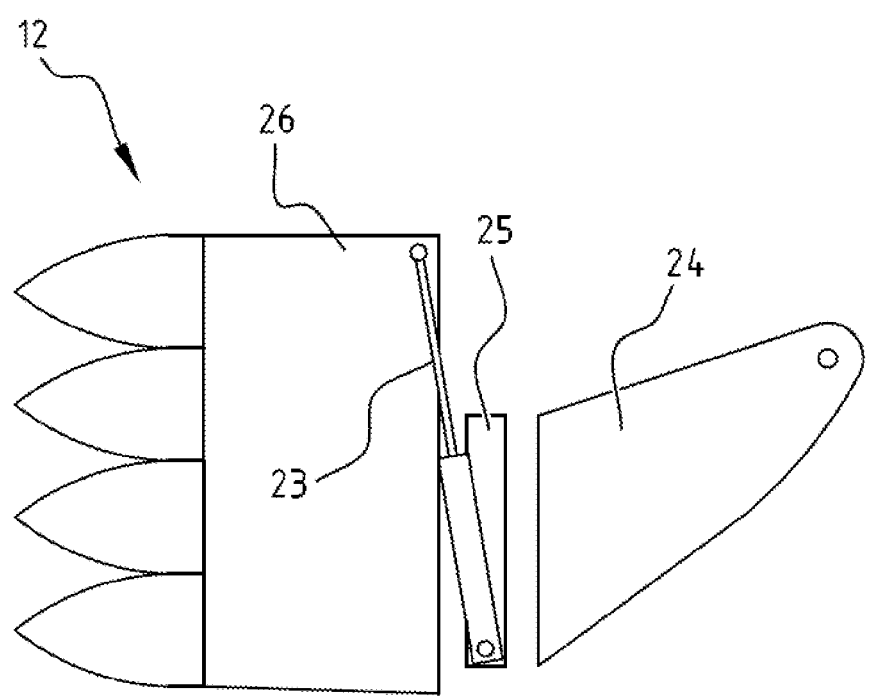

In the embodiment of FIGS. 2A and 2B, the central segments 13 and 14 are interconnected via a central pivot 19 which is located, when the header 12 is considered in the operational state, at the bottom side of the central segments 13, 14. Because this pivot 19 is located at the bottom side of the segments 13, 14 and is adapted to allow a downward rotation 21, a lifting mechanism is provided. The lifting mechanism is illustrated in FIGS. 4A and 4B, which is described hereunder. The lifting mechanism can be different from the shown lifting mechanism of FIGS. 4A and 4B. The lifting mechanism of FIGS. 4A and 4B is only shown as an example, and is not intended to limit the invention. The lifting mechanism is adapted to move the header upward, as is illustrated in FIG. 2A with arrow 22. Particularly, the central pivot 19 is lifted from an operational position to a folded position which is higher than the operational position. By lifting the header 12 before or while folding the header 12, collision of header parts with the ground surface can be avoided.

Instead of lifting the whole header 12, the central pivot 19 may be arranged such that it can be lifted relative to other parts of the header 12 (e.g. a header frame carrying the segments), thereby effectively initiating the rotation of the two central segments 13, 14, relative to each other. This may, e.g., be achieved by attaching the central pivot 19 to a hydraulic or pneumatic cylinder (other end connected to the other header parts) or by placing it in a guided track and moving it using an electric or hydraulic motor. In a further embodiment, also (or only) the distal pivots 17, 18 are moved by cylinders and/or through guide rails. When, e.g., placing all pivots 17,18,19 in suitably arranged guide rails, just lifting up the central pivot 19 will simultaneously cause rotation in all pivots 17,18,19. In addition to supporting the movement of the pivot points 17,18,19, other guide pins or rails may assist other parts of the segments 13,14,15,16 in their motion while the header is being folded or unfolded.

FIGS. 2A and 2B show the header 12 from the same relative point of view as the prior art header 2 in FIGS. 1A and 1B. The pivots 17, 18 and 19 in the header 12 allow a rotation around axes that are substantially parallel to, or slightly inclined with respect to the forward driving direction of the agricultural vehicle carrying the header. Preferably, each pivot 17, 18, 19 only allows movement with a single degree of freedom, the single degree of freedom being the rotation around the pivot axis. Such movement of adjacent segments characterized by a single degree of freedom is easy to realize and to control. Furthermore, rotation around axes that are substantially parallel to the forward driving direction of the agricultural vehicle has no significant effect on the position of the center of gravity of the header. Particularly, when the header is formed substantially symmetrical along the width, as is shown in FIGS. 2 and 3, the center of gravity remains substantially the same when folding the header. Particularly a forward displacement of the center of gravity would have a negative effect. Even when folding the header 12 in an asymmetric manner, the center of gravity does not move forward.

FIG. 2B shows that the header segments 13, 14, 15, 16, in the folded state, form a substantially rectangular frontal surface having a width that falls within the predetermined width, defined above, and having a substantially constant height. Thereby, a compact package of header segments is obtained. The height of the header 12 in the folded state allows an operator of the agricultural vehicle to have an acceptable free view above the folded header. This free view is necessary for driving the agricultural vehicle without accidents.

Figure 3A:
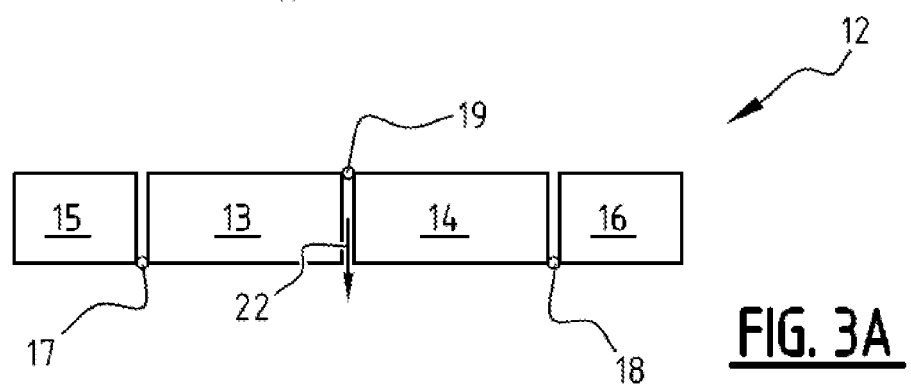
FIGS. 3A and 3B show a front view of a header according to a further embodiment of the invention.
Figure 3B:
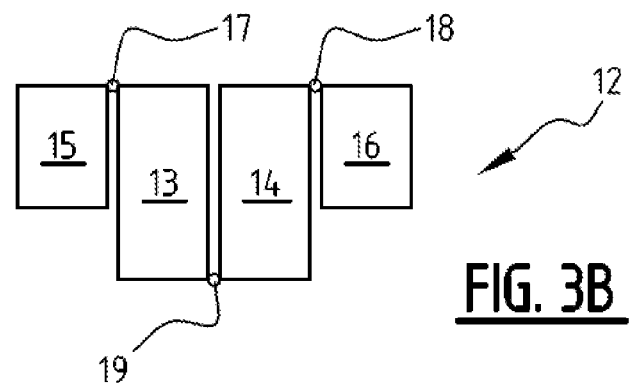

FIGS. 3A and 3B show an embodiment of the header 12 wherein the position of the pivot, and wherein the corresponding movements are mirrored with respect to a horizontal axis. The operation and advantages of the folding concept are identical to the operation and advantages of the header of FIGS. 2A and 2B. In the embodiment of FIGS. 3A and 3B, the central pivot 19 allows an upward rotation while the distal pivots 17, 18 allow a downward rotation of the segments with respect to each other. Instead of lifting the central pivot, as is indicated with arrow 22 in FIG. 2A, a lowering of the central pivot 19 is provided in FIG. 3A, also indicated with reference number 22. In the embodiment of FIGS. 3A and 3B, the distal segments 15 and 16 are smaller than the central segments and comprise only two row elements. The embodiment of FIGS. 3A and 3B therefore illustrates a header with ten row elements. The set-up of FIGS. 3A and 3B equally allows to form the header with twelve row elements. The folding concept of FIGS. 2A and 2B also allows to form the header with ten row elements.

FIGS. 4A and 4B show a header according to an embodiment of the invention in a side view. Thereby, FIG. 4A shows the feeder 24 which is part of the agricultural vehicle 1. In operation, the header 12 is connected to the feeder 24, and is carried by the feeder 24. To this end, the header 12 comprises a connector. A lifting mechanism 23 is provided between the connector 25 and the header segments. To this end, the header segments preferably comprise a rigid frame 26 to which the harvesting and processing elements of the header are mounted. FIG. 4A illustrates the header in an operating state where the frame 26 and the connector 25 are aligned so that crop material can be gathered by the header and transported via the feeder 24 to the body of the agricultural vehicle. In FIG. 4B, the header is illustrated in the folded state. Since FIGS. 4A and 4B are side views, the lower side of a distal segment is shown. FIG. 4B further shows an example of a lifting mechanism 23 is in an extended state, lifting the central pivot 19 to a position above the operation position.

While the present invention proposes a new folding concept with a central pivot and two distal pivots, the skilled person will understand that many techniques that are used in prior art headers as illustrated in FIGS. 1A and 1B can be applied to the header 12 of the invention. Particularly, disengaging and engaging of moving elements that run across the different segments along the width of the header, can be used by the skilled person in the concept of the invention. Actuators for automatically rotating the header segments 13, 14, 15, 16 with respect to each other around the pivots 17, 18, 19 can be added to the header 12. Regarding the lifting mechanism 23, a lifting mechanism interconnecting the frame 26 and the connector 25 allowing an upward movement of the frame 26 with respect to the connector 25 can be designed by the skilled person.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A header comprising:
   a frame segmented into a plurality of segments comprising two peripheral segments and two central segments, the two central segments each comprise a proximal end and a distal end, the two central segments are pivotally interconnected to each other at their respective proximal ends by a central pivot defining a central rotation such that the central segments rotate relative to one another in a first rotational direction, and each peripheral segment is respectively pivotally connected to each distal end of each central segment by a respective distal pivot defining a distal rotation such that each peripheral segment rotates relative to each central segment in a second rotational direction that is opposite to the first rotational direction; and
   a plurality of row elements along a width of the header, the plurality of row elements connected to the frame, wherein the two peripheral segments and the two central segments are movable with respect to each other between a folded state in which the peripheral and central segments are vertically oriented and folded relative to one another and an operating state in which the peripheral and central segments are horizontally oriented and positioned in line with one another.

2. The header according to claim 1, wherein the distal rotation is an upward rotation and the central rotation is a downward rotation, and wherein the header further comprises a connector for connecting the header to an agricultural vehicle, and wherein the frame is connected to the connector via a lifting mechanism for lifting the frame with respect to the connector when the two peripheral segments and the two central segments are in the folded state to a lifted position above an operating position.

3. The header according to claim 2, wherein the central rotation is initiated by lifting the central pivot relative to the pair of distal pivots.

4. The header according to claim 1, wherein the distal rotation is a downward rotation and the central rotation is an upward rotation, and wherein the header further comprises a connector for connecting the header to an agricultural vehicle, and wherein the frame is connected to the connector via a lifting mechanism for lowering the frame with respect to the connector when the two peripheral segments and the two central segments are in the folded state to a lowered position below an operating position.

5. The header according to claim 4, wherein the central rotation is initiated by lowering the central pivot relative to the pair of distal pivots.

6. The header according to claim 1, wherein each of the pair of distal pivots is located, in the operating state of the two peripheral segments and the two central segments, at an upper end of adjacent ones of the plurality of segments and at a side edge of each of the adjacent ones of the plurality of segments, the side edge of each of the adjacent ones of the plurality of segments facing one another.

7. The header according to claim 6, wherein the central pivot is connected, in the operating state of the two peripheral segments and the two central segments, at a lower end of the two central segments and at a side edge of each proximal end of the two central segments, the side edge of each of the two central segments facing one another.

8. The header according to claim 1, wherein the operating state of the two peripheral segments and the two central segments corresponds to a state wherein the two peripheral segments and the two central segments are parallel such that head sides of adjacent ones of the two peripheral segments and the two central segments face each other, and wherein the folded state of the two peripheral segments and the two central segments corresponds to a state wherein the two peripheral segments and the two central segments are parallel such that longitudinal sides of adjacent ones of the two peripheral segments and the two central segments face each other.

9. The header according to claim 1, wherein the each of the two peripheral segments and the two central segments comprises a rigid structure, wherein the rigid structure of each of the two peripheral segments and the two central segments carries respective ones of the plurality of row elements, and wherein the rigid structures of the two peripheral segments are connected to the rigid structures of the two central segments via the pair of distal pivots, and wherein the rigid structures of the two central segments are interconnected via the central pivot.

10. The header according to claim 1, further comprising an actuator at each of the two distal pivots to actuate the distal rotation and at the central pivot to actuate the central rotation.

11. The header according to claim 1, further comprising at least one driving shaft extending along the width of the header, the at least one driving shaft comprising a plurality of detachable couplings, each detachable coupling is positioned in between each of the plurality of segments, and the at least one driving shaft is operably connected to the plurality of row elements in the operating state of the two peripheral segments and the two central segments for driving the plurality of row elements.

12. The header according to claim 1, wherein the plurality of row elements comprises ten row elements, three of the ten row elements provided at each of the two central segments, and two of the ten row elements provided at each of the two peripheral segments.

13. The header according to claim 1, wherein the plurality of row elements comprises twelve row elements, three of the twelve row elements provided at each of the two central segments, and three of the twelve row elements provided at each of the two peripheral segments.

* * * * *